US010052765B2

(12) United States Patent
Kamoi et al.

(10) Patent No.: US 10,052,765 B2
(45) Date of Patent: Aug. 21, 2018

(54) ROBOT SYSTEM HAVING AUGMENTED REALITY-COMPATIBLE DISPLAY

(71) Applicant: FANUC Corporation, Yamanashi (JP)

(72) Inventors: Toshiaki Kamoi, Yamanashi (JP); Gou Inaba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 156 days.

(21) Appl. No.: 14/937,883

(22) Filed: Nov. 11, 2015

(65) Prior Publication Data
US 2016/0158937 A1 Jun. 9, 2016

(30) Foreign Application Priority Data

Dec. 8, 2014 (JP) .................................. 2014-248127

(51) Int. Cl.
*B25J 9/16* (2006.01)
(52) U.S. Cl.
CPC ........... *B25J 9/1671* (2013.01); *B25J 9/1605* (2013.01); *B25J 9/1628* (2013.01); *B25J 9/1697* (2013.01);
(Continued)
(58) Field of Classification Search
CPC ...... B25J 9/1605; B25J 9/1628; B25J 9/1671; B25J 9/1697; Y10S 901/05; G05B 2219/39451
See application file for complete search history.

(56) References Cited

U.S. PATENT DOCUMENTS

2004/0189631 A1* 9/2004 Kazi ...................... B25J 9/1671
345/418
2009/0326556 A1* 12/2009 Diolaiti .............. A61B 1/00009
606/130
(Continued)

FOREIGN PATENT DOCUMENTS

JP 2-167691 A 6/1990
JP 9-212219 A 8/1997
(Continued)

OTHER PUBLICATIONS

Rouse, Margaret. "What Is Augmented Reality (AR)?" WhatIs.com, Nov. 24, 2014, whatis.techtarget.com/definition/augmented-reality-AR. (Year: 2014).*

*Primary Examiner* — Khoi H Tran
*Assistant Examiner* — Robert T Nguyen
(74) *Attorney, Agent, or Firm* — Hauptman Ham, LLP

(57) ABSTRACT

A robot system using an augmented reality-compatible display, capable of providing information on the status and/or an operation guide of a robot added to an actual image or actual environment, to a user of the robot, so as to improve the efficiency of operations carried out by the user. The robot system includes an actual robot, a controller which controls the actual robot, and an image capturing-displaying device connected to the controller by a wire or by radio. The image capturing-displaying device has a function for capturing an image of a scene including the actual robot and a function for displaying the captured image in real-time. The user can obtain a scene including the actual robot in real-time by directing a camera arranged on the image capturing-displaying device toward the actual robot, and can monitor an augmented reality image.

19 Claims, 6 Drawing Sheets

(52) U.S. Cl.
CPC ... *G05B 2219/39451* (2013.01); *Y10S 901/05* (2013.01)

(56) References Cited

U.S. PATENT DOCUMENTS

| | | | |
|---|---|---|---|
| 2011/0152882 A1* | 6/2011 | Wenderow | A61B 5/7475 606/130 |
| 2014/0018957 A1* | 1/2014 | Matsumoto | B25J 9/1697 700/251 |
| 2015/0199106 A1* | 7/2015 | Johnson | G06F 3/011 715/740 |
| 2016/0104276 A1* | 4/2016 | Engel | G01N 21/8851 382/141 |
| 2016/0124424 A1* | 5/2016 | Strong | G05B 19/41805 700/98 |
| 2016/0207198 A1* | 7/2016 | Willfor | G05B 19/4061 |

FOREIGN PATENT DOCUMENTS

| | | |
|---|---|---|
| JP | 2004-243516 A | 9/2004 |
| JP | 2011-88219 A | 5/2011 |
| JP | 2011-189431 A | 9/2011 |
| JP | 2012-171024 A | 9/2012 |
| JP | 2012-218120 A | 11/2012 |
| JP | 2014-97539 A | 5/2014 |
| JP | 2014-180707 A | 9/2014 |

* cited by examiner

OVERRIDE LOW  ↔  OVERRIDE HIGH

ROBOT SYSTEM HAVING AUGMENTED REALITY-COMPATIBLE DISPLAY

RELATED APPLICATIONS

The present application claims priority to Japanese Application Number 2014-248127, filed Dec. 8, 2014, the disclosure of which is hereby incorporated by reference herein in its entirety.

BACKGROUND OF THE INVENTION

1. Field of the Invention

The preset invention relates to a robot system having an augmented reality-compatible display to which information corresponding to a status of a robot and navigation information in operating the robot is added.

2. Description of the Related Art

In a robot system of the prior art, a status of a robot or a work of a user may be navigated by using a technique regarding virtual reality (VR). However, the robot and a robot environment in the virtual reality are different from an actual robot and an actual environment, as a degree of reproducibility of the actual robot and environment is decreased.

Therefore, in a recent robot system, a technique regarding augmented reality (AR) (for example, an AR-compatible display) is used, in order to display the status of the robot or assist (or navigate) the work of the user. For example, JP 2014-097539 A discloses a method and a device, by which a biped robot is remotely-operated by a user in a master-slave manner. This document describes that the user moves a foot while monitoring an augmented reality (AR) image.

On the other hand, JP 2014-180707 A discloses a robot device including: a robot control part which operates a robot based on an operation program; a robot capturing part which obtains image data; a data processing part which has a virtual space data holding portion and an augmented reality space data generation portion for generating AR space data by utilizing at least the image data and the virtual space data; and a display part which displays an image of the AR space. This document describes that the virtual space data includes information on a virtual object obtained by simulating an object existing in a real work space of the robot.

In the invention of JP 2014-097539 A, the user can stabilize the position and posture of a foot by using the AR image. On the other hand, in the invention of JP 2014-097539 A, a teaching operation for the robot can easily and safely carried out without generating interference between the robot and peripheral equipment thereof, by generating the AR space data based on the image data of the actual robot and the virtual space data including the virtual object. Generally, the status or the navigation (or operation guide) regarding the robot is displayed by using a numerical number or a character, and thus none of the references does not describes that the status or the navigation is provided to the user by using the augmented reality.

SUMMARY OF THE INVENTION

Therefore, an object of the present invention is to provide a robot system using an augmented reality-compatible display, capable of providing information on the status and/or an operation guide of a robot added to an actual image or actual environment, to a user of the robot, so as to improve the efficiency of operations carried out by the user.

According to the present invention, there is provided a robot system comprising: a robot; a controller which controls the robot; an image capturing-displaying device connected to the controller, and having a function for capturing an image of a scene including the robot and a function for displaying the image in real-time; and a measuring part which measures relative position and angle between the robot and the image capturing-displaying device, based on the image displayed in real-time on the image capturing-displaying device, wherein the image capturing-displaying device has a display on which additional information representing a status or an operation guide of the robot is overlapped with the image displayed on the image capturing-displaying device in real-time, based on the relative position and angle measured by the measuring part.

In a preferred embodiment, the image capturing-displaying device has a display for displaying a video image of an actual scene, and the additional information is overlapped with an actual image of the robot included in the video image.

In a preferred embodiment, the image capturing-displaying device has a display for displaying a transmissive image of an actual scene, and the additional information is overlapped with an actual image of the robot of the transmissive image.

In a preferred embodiment, the image capturing-displaying device is a teaching pendant connected to the controller.

For example, the additional information is an image representing a direction in which the robot is capable of being moved by manual operation.

For example, the additional information is a luminescent image, a luminescence intensity of which corresponds to a present value of a velocity override of the robot.

For example, the additional information is a luminescent image of an apparatus in which an abnormality is detected.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
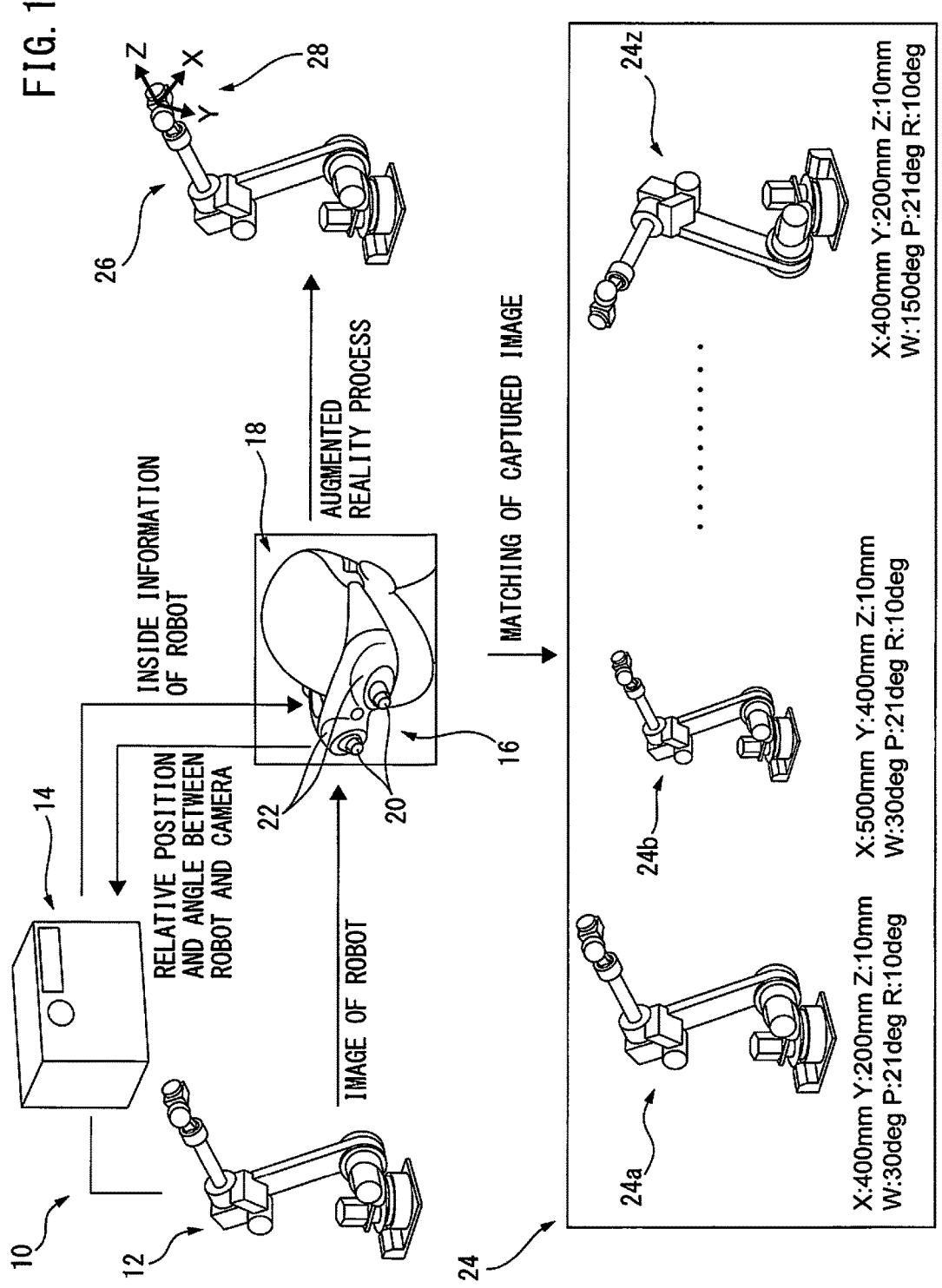
FIG. 1 is a view showing a schematic configuration of a robot system according to a first embodiment of the present invention.

FIG. 1 shows a schematic configuration of a robot system 10 according to a first embodiment of the present invention.

Robot system 10 includes an actual robot 12, a robot controller (hereinafter, also referred to as merely a controller) 14 which controls actual robot 12, and an image capturing-displaying device (or an augmented reality (AR)-compatible display) 16 connected to controller 14 by a wire or by radio. Image capturing-displaying device 16 has a function for capturing an image (or a video image) of a scene including the actual robot and a function for displaying the captured image in real-time. In the embodiment as explained below, the functions of the image capturing-displaying device of the invention and a measuring part are provided to AR-compatible display 16 or a teaching pendant 42 as described below. However, some of the functions may be provided to another means.

In the embodiment of FIG. 1, image capturing-displaying device 16 is illustrated as a head-mounted display which is wearable by a user 18. User 18 can capture (obtain) a scene including actual robot 12 in real-time by directing a camera 20 arranged on head-mounted display 16 toward actual robot 12, and can monitor an AR image 26 via a displaying part 22 as described below.

Figure 2:
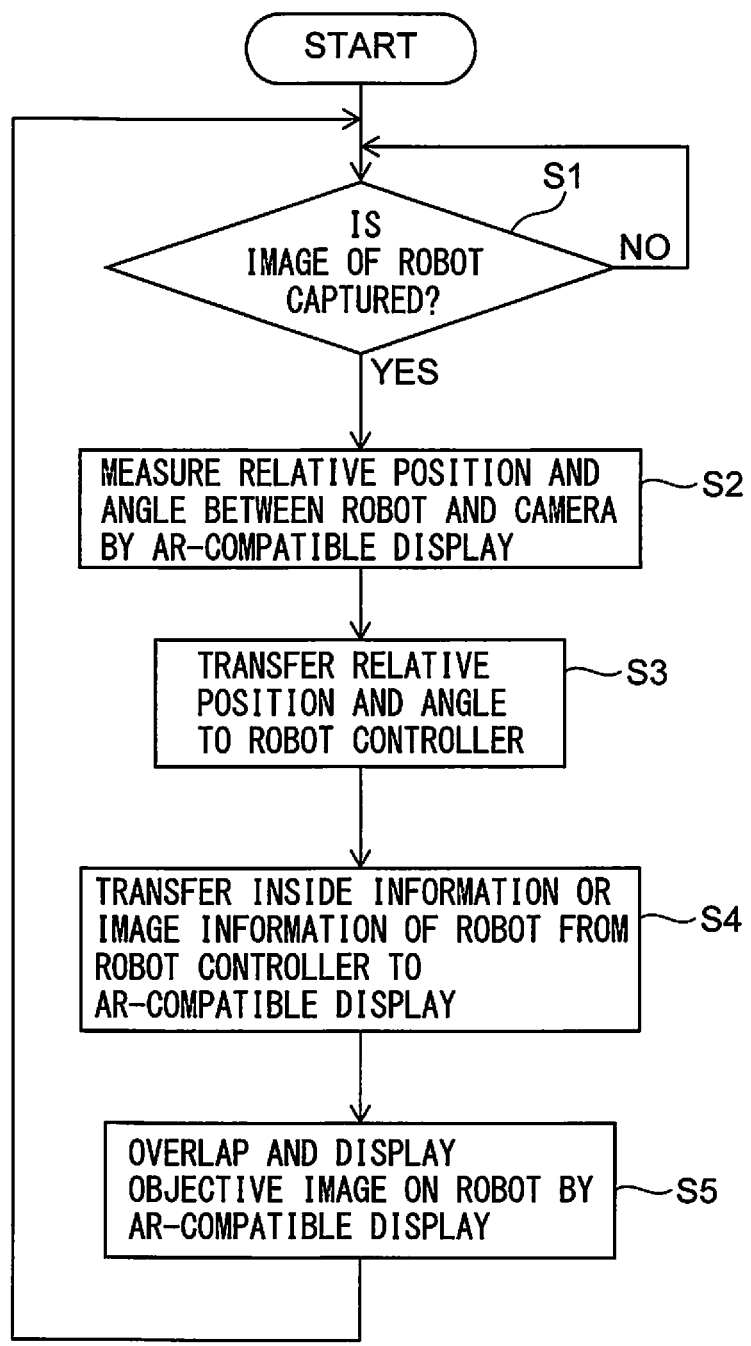
FIG. 2 is a flowchart showing an example of a procedure in the robot system of the present invention.

Next, a procedure in robot system 10 will be explained with reference to a flowchart as shown in FIG. 2. First, an actual environment (scene) including actual robot 12 is captured by AR-compatible display 16 in which a computer and a memory are incorporated. When the image of actual robot 12 is correctly captured (step S1), among a plurality of image models 24 (see FIG. 1) previously stored in AR-compatible display 16, an image model, which is closest to the image of actual robot 12 captured by AR-compatible display 16, is detected (in other words, matching is carried out). In the embodiment of FIG. 1, among a plurality of image models 24a to 24z, image model 24a closest to the captured image of actual robot 12 is detected (or selected).

Next, by using AR-compatible display 16, relative position and angle of actual robot 12 relative to (camera 20 of) AR-compatible display 16 are measured (step S2). Concretely, as shown in FIG. 1, values indicating the position and orientation (i.e., the relative position and angle) of a representative point (for example, a tool center point) of the robot relative to AR-compatible display 16 are previously associated with each of the plurality of image models, and then the relative position and angle associated with detected image model 24a are measured as the relative position and angle between AR-compatible display 16 and actual robot 12. In the illustrated embodiment, actual robot 12 is a multi-joint robot having six axes, and the relative position and angle of the tool center point of the robot are represented by six parameters (X, Y, Z, W, P, R).

Next, in step S3, the relative position and angle measured by AR-compatible display 16 are transmitted to controller 14. In the next step S4, inside information of actual robot 12, required for the AR process, is transmitted from controller 14 to AR-compatible display 16.

In the next step S5, specified additional information image is generated in AR-compatible display 16 based on the inside information of actual robot 12 from controller 14, and the augmented reality process is carried out with respect to the captured image of actual robot 12 so as to display the augmented reality robot (AR robot) on displaying part 22. In this embodiment, the inside information of actual robot 12 includes the direction of each axis (X, Y, Z) of a robot coordinate system with respect to the tool center point. In the image of the AR robot, an image representing an orthogonal coordinate system 28 is displayed as an additional information image (or an operation guide of the actual robot), and is overlapped with the image of actual robot 12, in which the tool center point is determined as the origin of coordinate system 28 and the direction of each axis of the robot coordinate system is determined as a reference axis of coordinate system 28.

By repeating above steps S1 to S5 at predetermined time intervals, the image of the AR robot is displayed on displaying part 22 in real-time, and user 18 can effectively carry out teaching operation, etc., while monitoring the displayed image.

Figure 3:
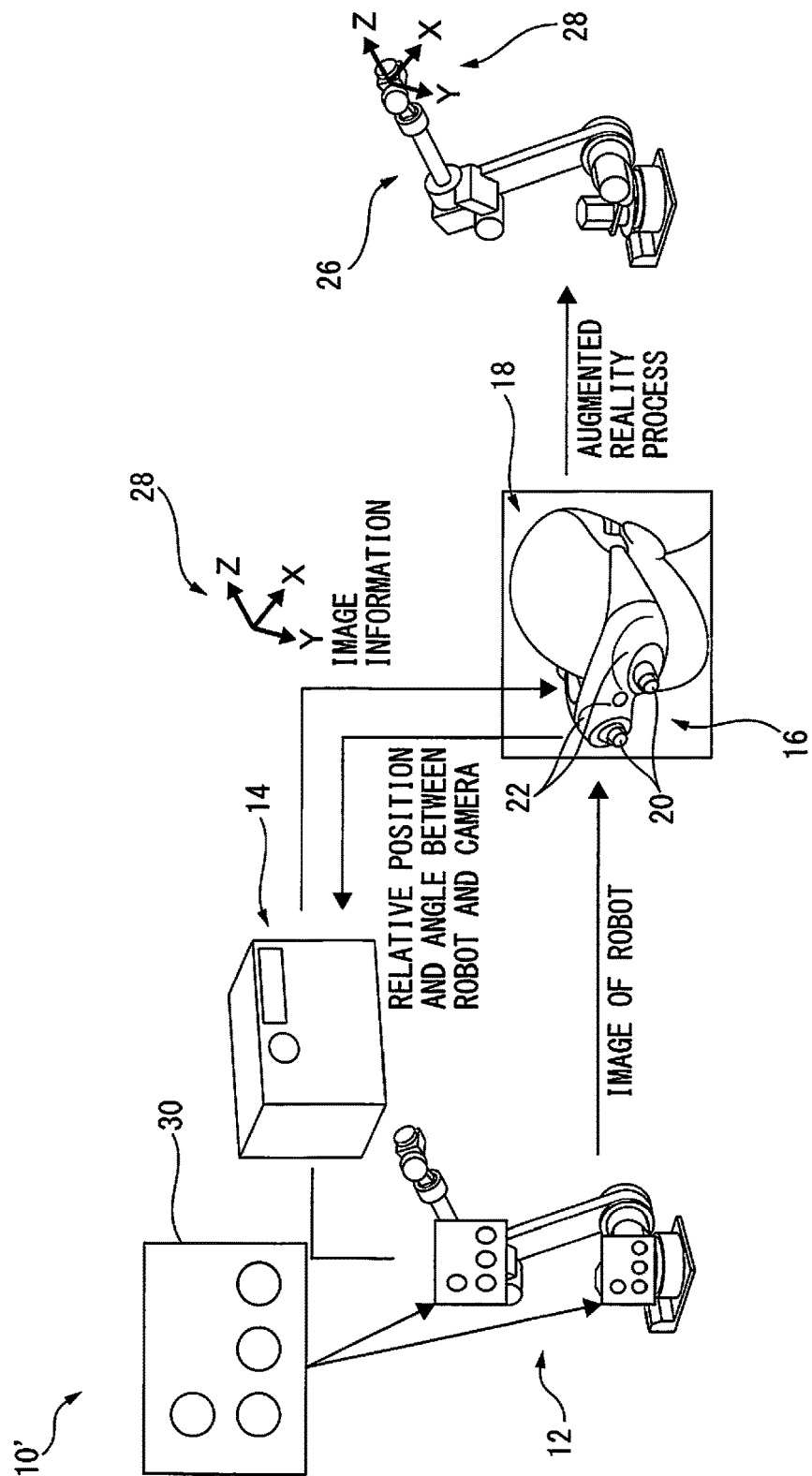
FIG. 3 is a view showing a schematic configuration of a robot system according to a second embodiment of the present invention.

FIG. 3 shows a schematic configuration of a robot system 10' according to a second embodiment of the present invention. Robot system 10' includes actual robot 12, controller 14 which controls actual robot 12, and image capturing-displaying device (or augmented reality (AR)-compatible display) 16 connected to controller 14 by a wire or by radio. Image capturing-displaying device 16 has a function for capturing a video image of a scene and a function for displaying the captured image in real-time.

In the embodiment of FIG. 3, image capturing-displaying device 16 is illustrated as a head-mounted display which is wearable by user 18. User 18 can capture (obtain) an image (or a video image) obtained by capturing a scene including actual robot 12 in real-time by directing camera 20 arranged on head-mounted display 16 toward actual robot 12, and can monitor AR image 26 via displaying part 22 as described below.

Next, a procedure in robot system 10' will be explained with reference to the flowchart as shown in FIG. 2. First, at least one marker 30 is attached to or formed on a predetermined portion (such as a rotating body, an upper arm or a forearm) of actual robot 12, and an actual environment (scene) including actual robot 12 is captured by AR-compatible display 16 in which a computer having an image processing function is incorporated. In this regard, actual robot 12 is captured so that marker 30 is included in the captured image.

When the image of actual robot 12 having marker 30 is correctly captured (step S1), image processing is carried out with respect to marker 30, and the relative position and angle of actual robot 12 relative to (camera 20 of) AR-compatible display 16 are measured (step S2). In this regard, although illustrated marker 30 includes four circles which are positioned on a generally L-shaped line, marker 30 may have an arbitrary shape as long as the position and orientation of (a representative point of) actual robot 12 can be detected by a conventional image processing.

Next, in step S3, the relative position and angle measured by AR-compatible display 16 are transmitted to controller 14. In the next step S4, an additional information image, required for the AR process, is generated in controller 14, and the generated additional information image is transmitted to AR-compatible display 16. In the second embodiment, similarly to the first embodiment of FIG. 1, the generated additional information image represents orthogonal coordinate system 28, in which the tool center point is determined as the origin of coordinate system 28 and the direction of each axis of the robot coordinate system is determined as a reference axis of coordinate system 28.

In the next step S5, in AR-compatible display 16, the augmented reality process is carried out with respect to the captured image of actual robot 12, the image representing orthogonal coordinate system 28 is overlapped with the image of actual robot 12, and the augmented reality robot (AR robot) is displayed on displaying part 22.

By repeating above steps S1 to S5 at predetermined time intervals, the image of the AR robot is displayed on displaying part 22 in real-time, and user 18 can effectively carry out teaching operation, etc., while monitoring the displayed image.

In the second embodiment, the additional information image such as orthogonal coordinate system 28 is generated in controller 14. However, similarly to the first embodiment, the inside information may be transmitted from controller 14 to AR-compatible display 16, and the additional information image may be generated in AR-compatible display 16. On the other hand, in the first embodiment, the additional information image such as orthogonal coordinate system 28 may be generated in controller 14, and the additional information image may be transmitted from controller 14 to AR-compatible display 16.

Figure 4:
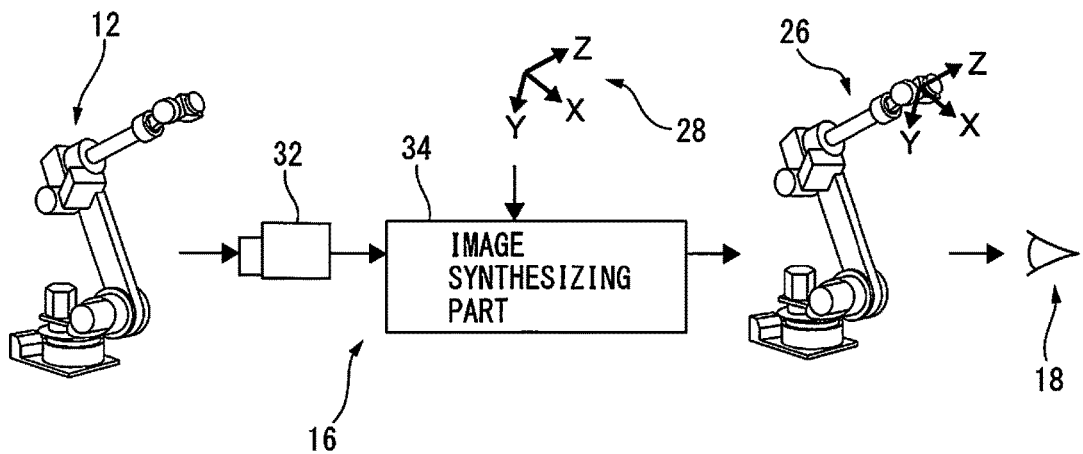
FIG. 4 shows an example of a concrete means for overlapping images in an AR-compatible display.
Figure 5:
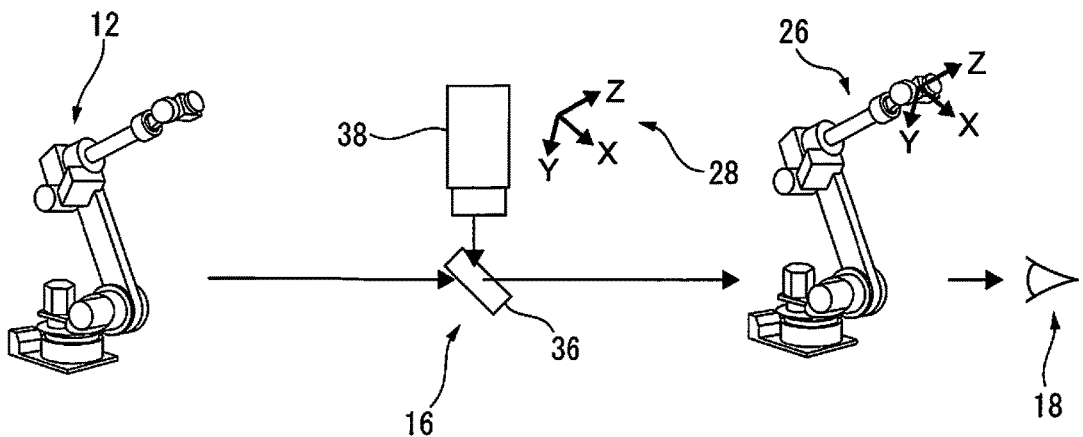
FIG. 5 shows another example of a concrete means for overlapping images in an AR-compatible display.

FIGS. 4 and 5 show examples of the means for overlapping images in AR-compatible display as shown in FIG. 1 or 3. First, in FIG. 4, AR-compatible display 16 is illustrated as a video transparentable head-mounted display which displays a video image of the actual scene. Concretely, AR-compatible display 16 has a video camera 32 which captures actual robot 12, and an image synthesizing part 34 which synthesizes additional information image 28 from controller 14 with an image captured by video camera 32, so that the additional information can be displayed and overlapped with the actual image of actual robot 12 included in the video image. By virtue of this, user 18 can monitor image 26 synthesized by image synthesizing part 34 as the augmented reality robot.

On the other hand, in FIG. 5, AR-compatible display 16 is illustrated as an optical transparentable head-mounted display which displays a transmissive image of the actual scene. Concretely, AR-compatible display 16 has an optical combiner 36 which transmits an image of actual robot 12, and a projector 38 which projects additional information image 28 on optical combiner 36, so that the additional information can be displayed and overlapped with the transmissive actual image of actual robot 12. By virtue of this, user 18 can monitor image 26 combined by optical combiner 36 as the augmented reality robot.

Figure 6:
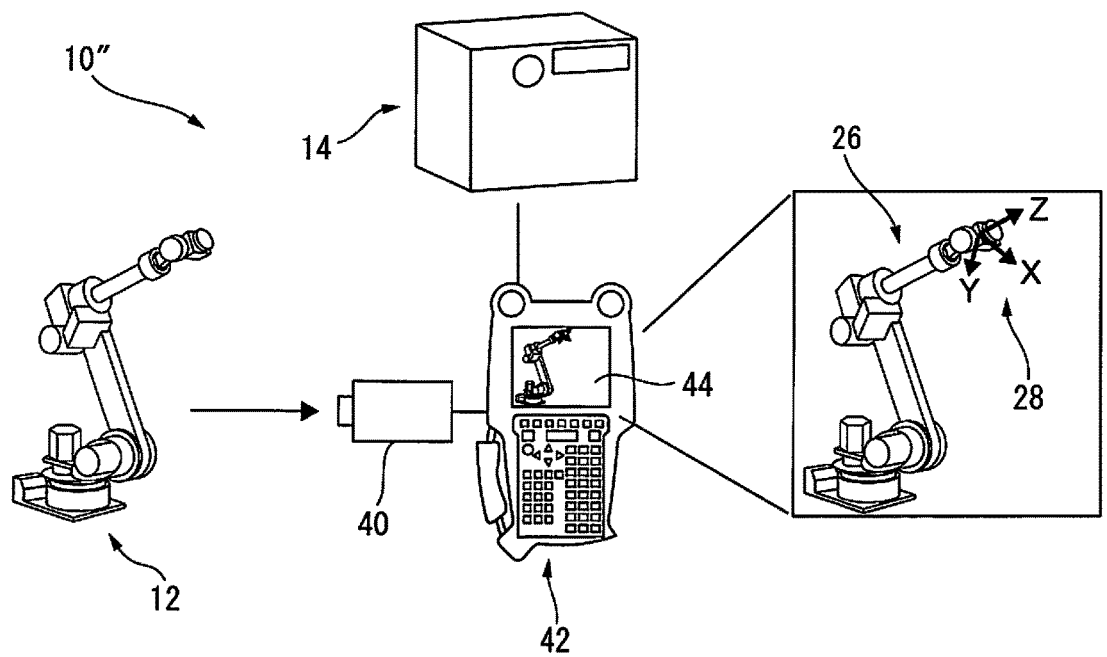
FIG. 6 is a view showing a schematic configuration of a robot system according to a third embodiment of the present invention.

FIG. 6 shows a schematic configuration of a robot system 10" according to a third embodiment of the present invention. In the third embodiment, a robot teaching pendant 42, on which a video camera 40 is mounted, has the function of the AR-compatible display. Concretely, robot system 10" includes actual robot 12, controller 14 which controls actual robot 12, and robot teaching pendant 42 operable by the user and connected to controller 14 by a wire or by radio.

Teaching pendant 42 has video camera 40 mounted thereon, and the user can capture (obtain) an image (or a video image) by capturing a scene including actual robot 12 in real-time by directing video camera 40 toward actual robot 12, and can monitor AR image 26 via a display 44 of teaching pendant 42. In the third embodiment, similarly to the first or second embodiment, the additional information image (in this case, orthogonal coordinate system 28) can be displayed and overlapped with the image of actual robot 12.

Figure 7:
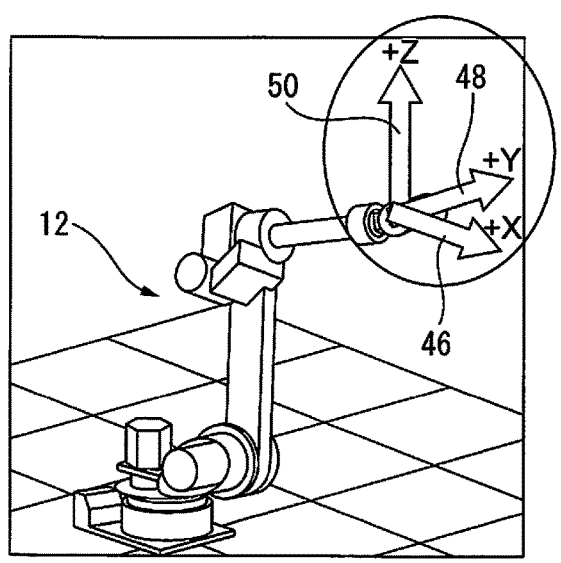
FIG. 7 shows an example of an image obtained by an augmented reality process.
Figure 8:
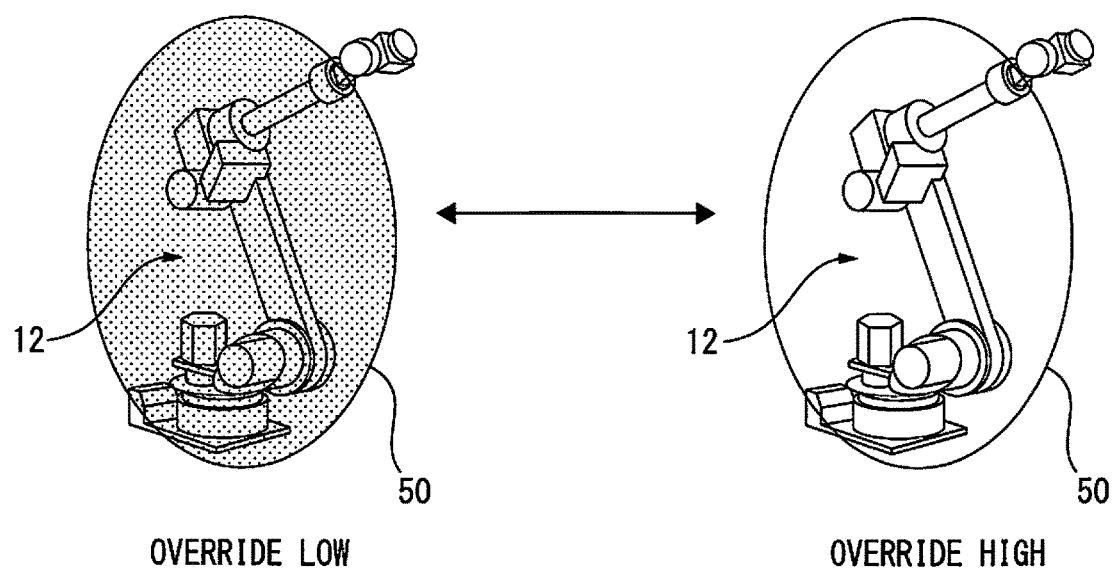
FIG. 8 shows another example of an image obtained by an augmented reality process.
Figure 9:
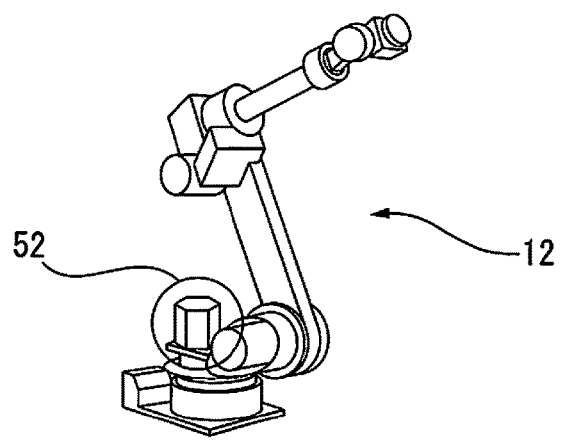
FIG. 9 shows still another example of an image obtained by an augmented reality process.

FIGS. 7 to 9 show preferable examples of an additional information image overlapped with the image of actual robot 12. First, FIG. 7 shows an operation guide of the actual robot (in this case, the direction of a manual operation (or jog operation) at the tool center point) displayed and overlapped with the image of actual robot 12. Concretely, an arrow representing a reference direction (in the drawing, arrows 46, 48 and 50 indicating +X, +Y and +Z-direction, respectively) from the tool center point is transmitted as the additional information image from above controller 14 to AR-compatible display 16 or teaching pendant 42, and AR-compatible display 16 or teaching pendant 42 can display and overlap the additional information image with the image of actual robot 12. In this regard, it is preferable that these reference directions be determined so that (the front end of) actual robot 12 may be moved along the directions by manual operation. By virtue of this, when the teaching of actual robot 12 is to be manually carried out, the user can precisely move the front end of actual robot 12 in the desirable direction.

FIG. 8 shows an example in which the additional information representing the status of the actual robot (in this case, an override value of the velocity (or a velocity override) of actual robot 12) can be visually recognized by the AR process. Normally, the velocity override is set with respect to the robot, and the override value may be changed by controller 14 under various conditions. Therefore, the override value is transmitted from controller 14 to AR-compatible display 16 or teaching pendant 42, and then AR-compatible display 16 or teaching pendant 42 displays and overlaps a luminescent display area 50 with the image of actual robot 12. Further, AR-compatible display 16 or teaching pendant 42 can vary a luminescence intensity (or brightness) of luminescent display area 50 corresponding to a present value of the velocity override (for example, the luminescence intensity may be increased as the velocity override is high). By virtue of this, the operator can intuitively know the present velocity override.

In the example of FIG. 8, area 50 having a generally oval shape, which roughly encompasses the image of actual robot 12, is made luminous. Alternatively, a part or whole of the image of actual robot 12 may be luminescent, and the luminescence intensity thereof may be varied depending on the present value of the velocity override.

FIG. 9 shows an example in which the additional information representing the status of the actual robot (in this case, an abnormal portion of actual robot 12) can be visually recognized by the AR process. In a device of actual robot 12, such as a motor for driving each axis of the robot or an encoder for detecting the position of each axis of the robot, an abnormality may occur due to a certain cause, and such an abnormality can be detected by controller 14 in many cases. Therefore, information regarding the device having the abnormality is transmitted from controller 14 to AR-compatible display 16 or teaching pendant 42, and then AR-compatible display 16 or teaching pendant 42 makes the abnormal portion (or device) luminous in actual robot 12, as shown in FIG. 9, so that the abnormal portion or device can be visually discriminated from the other portions. By virtue of this, the user can easily and rapidly find the abnormal device.

In the example of FIG. 9, an abnormality occurs in a motor (for example, a servomotor) for driving a rotating body of actual robot 12, and an area 52 having a generally circular shape, which roughly encompasses the motor, is made luminous. Alternatively, a part or all of the motor may be luminescent, and the luminescence intensity thereof may be varied depending on the present value of the velocity override.

The various additional information as exemplified in FIGS. 7 to 9 may be combined and displayed or overlapped. Further, the overlapping display of the additional information may be applied to any of the embodiments as shown in FIGS. 1, 3 and 6, and/or any of the types of display as shown in FIGS. 4 and 5.

In the conventional robot system, the status of the robot is usually represented by a numerical number or a character, and thus it is difficult to intuitively understand the content of the information. On the other hand, in the present invention, by using the augmented reality space, the user can feel as if the visualized status or operation guide of the robot is displayed in the real space. Therefore, the user can easily carry out the teaching operation of the robot.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A robot system, comprising:
   a robot;
   a controller configured to control the robot; and
   an image capturing-displaying device connected to the controller, and configured to
      store a plurality of image models of the robot,
      associate each of the plurality of image models with corresponding relative position and angle between the robot and the image capturing-displaying device,
      capture an image of a scene including the robot,
      display the captured image in real-time,
      among the plurality of image models, detect an image model closest to an image of the robot in the captured image, and
      measure the relative position and angle associated with the detected closest image model as relative position and angle between the robot and the image capturing-displaying device in the image displayed in real-time on the image capturing-displaying device,
   wherein the image capturing-displaying device has a display configured to display additional information visually representing a status or an operation guide of the robot in a manner that the additional information is overlapped with the image displayed on the image capturing-displaying device in real-time, based on the relative position and angle measured by the image capturing-displaying device, and
   wherein the image capturing-displaying device is configured to generate the additional information based on inside information of the robot transmitted from the controller.

2. The robot system as set forth in claim 1, wherein the image capturing-displaying device has a display configured to display
   a video image of the scene, and
   the additional information overlapped with the image of the robot included in the video image.

3. The robot system as set forth in claim 1, wherein the image capturing-displaying device has a display configured to display
   the scene including the image of the robot, and
   the additional information overlapped with the image of the robot in the scene.

4. The robot system as set forth in claim 1, wherein the image capturing-displaying device comprises a teaching pendant connected to the controller.

5. The robot system as set forth in claim 1, wherein the additional information includes an image representing a direction in which the robot is movable by manual operation.

6. The robot system as set forth in claim 1, wherein the additional information includes a luminescent image, a luminescence intensity of which corresponds to a present value of a velocity override of the robot.

7. The robot system as set forth in claim 1, wherein the additional information includes a luminescent image of an apparatus in which an abnormality is detected.

8. The robot system according to claim 1, wherein the image capturing-displaying device comprises a camera and a displaying device, and the camera is mounted on the displaying device.

9. The robot system according to claim 4, wherein the teaching pendant comprises a camera and a displaying device, and the camera is mounted on the teaching pendant.

10. A robot system, comprising:
    a robot;
    a controller configured to control the robot; and
    a teaching pendant having a video camera mounted thereon, the teaching pendant connected to the controller, and configured to
       store a plurality of image models of the robot,
       associate each of the plurality of image models with corresponding relative position and angle between the robot and the video camera,
       capture an image of a scene including the robot,
       display the captured image in real-time,
       among the plurality of image models, detect an image model closest to an image of the robot in the captured image, and
       measure the relative position and angle associated with the detected closest image model as relative position and angle between the robot and the video camera in the image of the scene including the robot,
    wherein the teaching pendant has an augmented reality-compatible display configured to display a luminescent image of a detected abnormal portion of the robot in a manner that the luminescent image is overlapped with the image displayed on the teaching pendant in real-time, based on the relative position and angle measured by the teaching pendant.

11. The robot system according to claim 10,
    wherein the controller is further configured to
       receive the relative position from the teaching pendant, and
       transmit inside information of the robot to the augmented reality-compatible display, and
    wherein the augmented reality-compatible display is configured to
       generate an image containing additional information, based on the inside information of the robot,
       carry out an augmented reality process with respect to the captured image of the robot, and
       display an augmented reality robot based on the augmented reality process.

12. The robot system according to claim 11, wherein
    the controller and the augmented reality-compatible display are configured to repeat respective operations of the controller and the augmented reality-compatible display at predetermined time intervals to generate an image of the augmented reality robot, and
    the augmented reality-compatible display is configured to display the image of the augmented reality robot.

13. The robot system according to claim 10, further comprising:
    a marker attached to or formed on a predetermined portion of the robot,
    wherein the augmented reality-compatible display is configured to capture an actual environment including the robot with the marker.

14. The robot system according to claim 10, wherein the teaching pendant is configured to synthesize an image containing additional information from the controller with the image captured by the video camera.

15. The robot system according to claim 14, wherein the augmented reality-compatible display comprises
   an optical combiner configured to transmit the image of the robot, and
   a projector configured to project an image containing the additional information on the optical combiner.

16. A robot system, comprising:
   a robot;
   a controller configured to control the robot; and
   a teaching pendant having a video camera mounted thereon, the teaching pendant connected to the controller, and configured to
      store a plurality of image models of the robot,
      associate each of the plurality of image models with corresponding relative position and angle between the robot and the video camera,
      capture an image of a scene including the robot,
      display the captured image in real-time,
      among the plurality of image models, detect an image model closest to an image of the robot in the captured image, and
      measure the relative position and angle associated with the detected closest image model as relative position and angle between the robot and the video camera in the image of the scene including the robot,
   wherein the teaching pendant has an augmented reality-compatible display configured to display a luminescent image of a motor, which is configured to drive a rotating body of the robot and in which an abnormality is detected, in a manner that the luminescent image is overlapped with the image displayed on the teaching pendant in real-time, based on the relative position and angle measured by the teaching pendant, and
   wherein an luminescence intensity of the motor on the luminescent image is varied depending on a present value of a velocity override of the robot.

17. The robot system according to claim 16,
   wherein the controller is further configured to
      receive the relative position from the teaching pendant, and
      transmit inside information of the robot to the augmented reality-compatible display, and
   wherein the augmented reality-compatible display is configured to
      generate an image containing additional information, based on the inside information of the robot,
      carry out an augmented reality process with respect to the captured image of the robot, and
      display an augmented reality robot based on the augmented reality process.

18. The robot system according to claim 17, wherein
   the controller and the augmented reality-compatible display are configured to repeat operations thereof at predetermined time intervals to generate an image of the augmented reality robot, and
   the augmented reality-compatible display is configured to display the image of the augmented reality robot.

19. The robot system according to claim 16, further comprising
   a marker attached to or formed on a predetermined portion of the robot,
   wherein the augmented reality-compatible display is configured to capture an actual environment including the robot with the marker.

* * * * *